United States Patent [19]

St. Germain

[11] Patent Number: 5,476,308
[45] Date of Patent: Dec. 19, 1995

[54] OCCUPANT-SUPPORT FABRIC FOR DECK OR LAWN-TYPE TUBULAR CHAIR FRAME

[76] Inventor: Robert J. St. Germain, 44 Gorman St., Naugatuck, Conn. 06770

[21] Appl. No.: 443,340

[22] Filed: Mar. 17, 1995

[51] Int. Cl.⁶ .................................................. A47C 7/26
[52] U.S. Cl. ................. 297/440.11; 297/229; 297/452.13
[58] Field of Search ............................... 297/228.12, 229, 297/284.2, 452.2, 452.18, DIG. 6, 452.12, 452.13, 440.11

[56] References Cited

U.S. PATENT DOCUMENTS

| | | | |
|---|---|---|---|
| 2,150,429 | 3/1939 | Sanno, Jr. ................. | 297/440.11 X |
| 2,725,096 | 11/1955 | Granby ..................... | 297/440.11 X |
| 4,230,364 | 10/1980 | Parker ...................... | 297/452.13 X |
| 4,482,186 | 11/1984 | Gomes ...................... | 297/440.11 |
| 4,892,353 | 1/1990 | Goddard ................... | 297/229 X |
| 5,275,463 | 1/1994 | Rocha ...................... | 297/229 |

Primary Examiner—Peter R. Brown
Assistant Examiner—Stephen Vu
Attorney, Agent, or Firm—Dallett Hoopes

[57] ABSTRACT

A sling extending from the upper end of the back of a tubular chair frame comes down in a seat portion and forward, is looped about the forward cross-piece of the frame and is doubled back under the seat portion. A separate elongate reinforcing web underlies the seat portion and is secured thereto in a non-shiftable position by woven fasteners to the underside of the seat portion. The double-back end of the sling is secured to the woven fastener on the underside of the reinforcing web, and the ends of the reinforcing web loop around the side elements of the frame and then are attached to each other under the seat portion with the desired amount of tension.

2 Claims, 2 Drawing Sheets

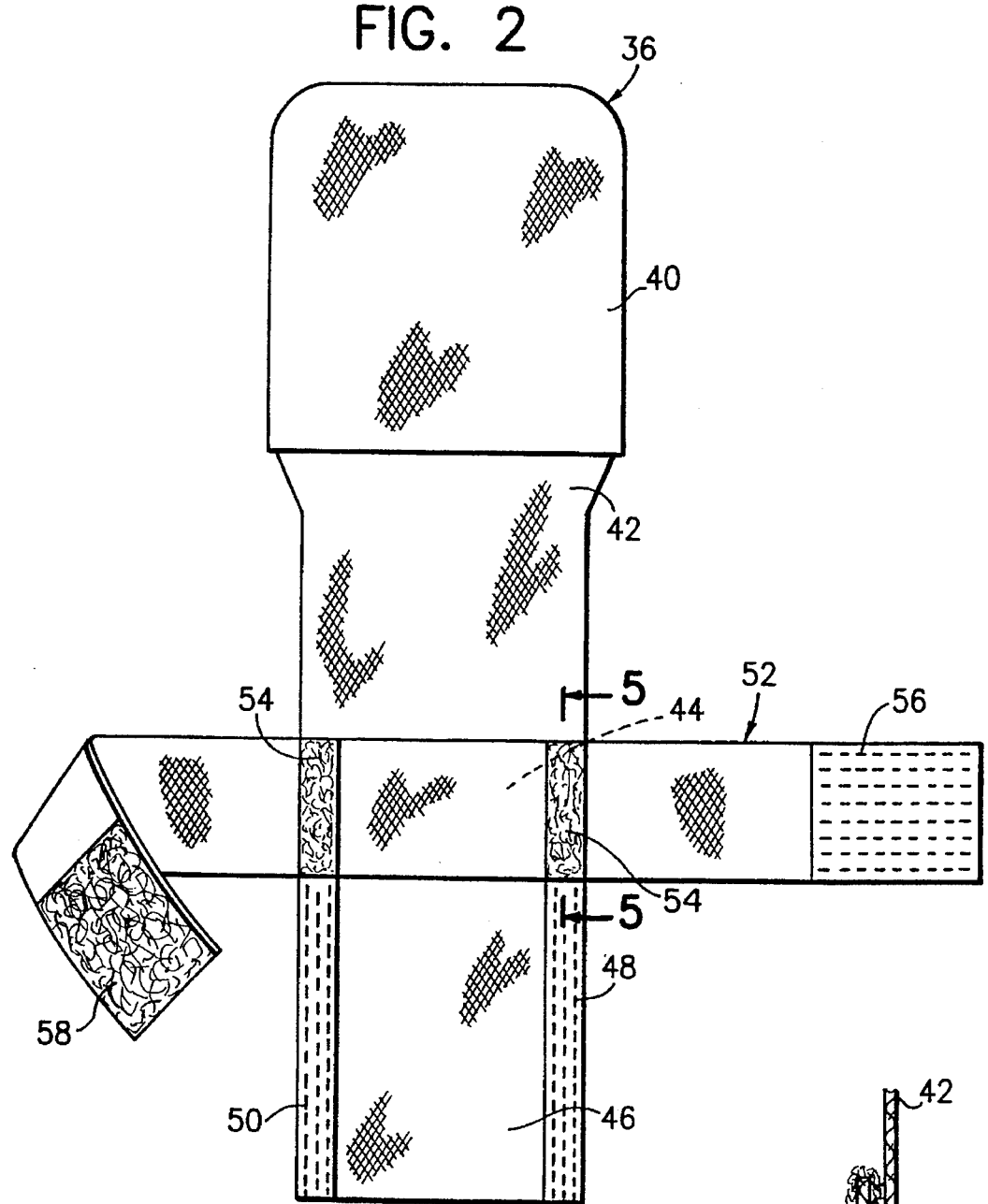
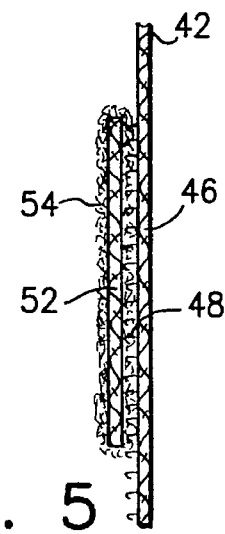
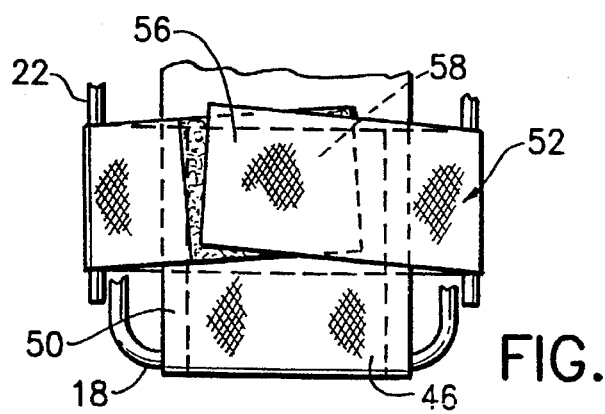

5,476,308

OCCUPANT-SUPPORT FABRIC FOR DECK OR LAWN-TYPE TUBULAR CHAIR FRAME

BACKGROUND OF THE INVENTION

This invention relates to a fabric seat and back for a tubular chair frame. More specifically, the invention relates to a fabric seat and back wherein the length of fabric for the back and seat is adjustable on the frame and the fabric reinforcement web for the seat is adjustable so that the contour of the support surfaces can be readily adjusted to please the occupant and to accommodate occupants of different sizes and shapes.

The prior art includes a number of patents disclosing tubular-framed chairs wherein the seat and back panel is in the form of a single broad strip or sling which is looped at either end, the loops each rounding a cross element of the chair frame. Among the chairs disclosed in the prior art having such structure is the rockable chair of deck or lawn type disclosed in the U.S. Pat. No. 2,675,059 to W. C. Martin issued Apr. 13, 1954.

Chairs of this general type in the prior art have often not been comfortable to occupants, particularly occupants of large or heavy stature in that a disproportionate part of their weight is centered over a seat portion of the broad strip and has caused the seat to sag down so that the forwardmost cross-piece bears upwardly on the underside of the knees. What has been needed in such chairs, particularly of the rockable variety, is means to support the seat portion of the strip so that it may be raised to a height, for instance, above the front cross-piece to support even the heaviest occupant without depressing the seat portion to a level below the front cross-piece. Such a height assures that the occupant is not subject to objectionable pressure on the underside of the knees as a result of the too prominent cross-piece.

SUMMARY OF THE INVENTION

Under the present invention there is provided a single-piece broad strip or sling extending from the top cross-piece down forward and looped about the forwardmost cross-piece to be doubled back under the sling. A separate elongate reinforcing web of fabric underlies the seat portion and is secured thereto in a non-shiftable position, either in a sideways direction or backwards and forwards. The elongate reinforcing web extends laterally and is looped over side elements on either side of the seat portion and is attached to itself in a way that may be adjusted to increase the tension.

Preferably, the reinforcing web is encircled by spaced bands of woven fasteners and the sling has mating bands so that the underside of the sling is engaged in firm releasable attachment to the reinforcing web and the doubled-back portion of the sling engages the underside of the reinforcing web in similar attachment. The opposite ends of the reinforcing web are provided with rectangles of complementing woven fasteners so that they can be firmly attached together. The woven fastener may be of the "Velcro" type.

BRIEF DESCRIPTION OF THE DRAWINGS

Further objects and features of the invention will be understood by those skilled in the art from reference to the following specification including the drawings, all disclosing a non-limiting form of the invention. In the drawings:

FIG. 2 is a bottom plan view of the back/seat sling laid out flat and the support panel disposed crosswise and showing one end of the support panel folded over to expose a portion of its woven fastener;

FIG. 5 is a sectional view taken on the line 5—5 of FIG. 2; and

FIG. 6 is a fragmentary reduced bottom plan view of the front of the chair of FIG. 1.

DESCRIPTION OF THE PREFERRED EMBODIMENT

Figure 1:
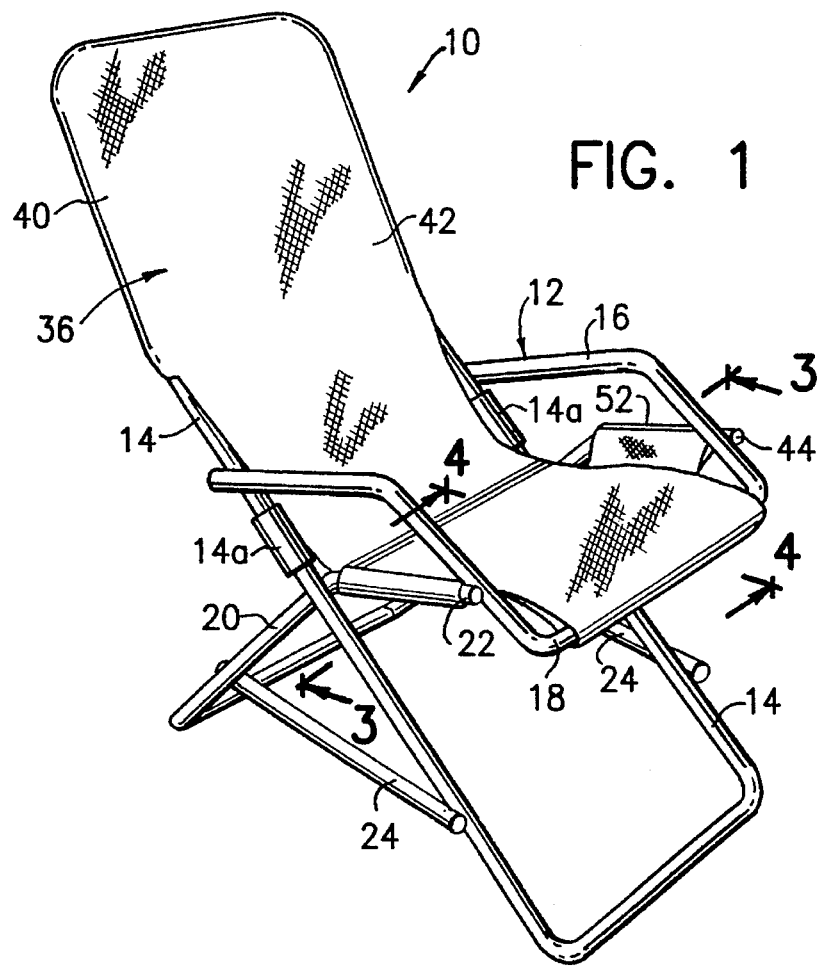
FIG. 1 is a perspective view of a chair embodying the invention.
Figure 3:
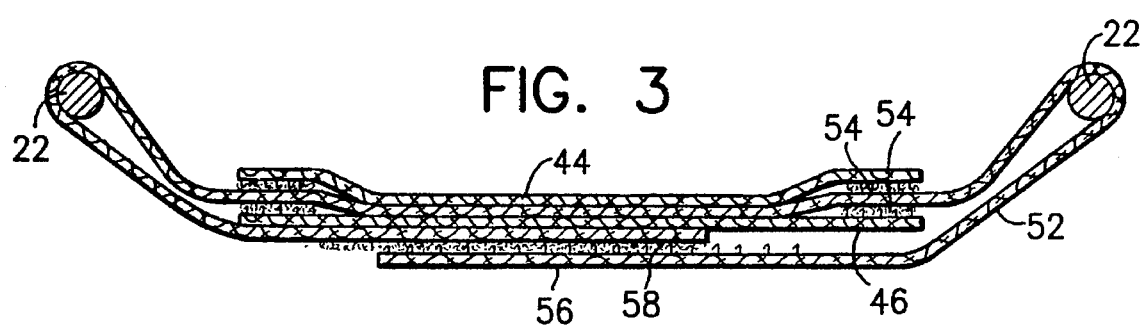
FIG. 3 is an enlarged sectional view taken on the line 3—3 of FIG. 1.

A chair embodying the invention is generally designated 10 in FIG. 1. It comprises a tubular frame 12 including a single generally rectangular tubular first element 14. Element 14 serves as both the back support at its upper end and the forward legs at its forward lower end.

Each of the elongate tubular sides of element 14 can be in two sections, divided intermediate the ends, hinged together (not shown) and can be selectively held in their continuous linear condition by a sliding sleeve 14a circumposing the adjacent ends of the two sections and the hinge and held there by stop means, spring detents (not shown) or the like. Alternatively, the sleeve can be slid longitudinally of the tubular side to permit the two sections to be folded at the hinge for greater compactness in traveling or storage.

A second element 16 which is U-shaped and bent downward at a forward location comprises the arms of the chair and the forward cross-piece 18. At the rearward end of the arms the second element 16 is pivotally attached respectively to the sides of the first element 14. A third U-shaped element 20 comprises rear legs and side elements 22 disposed at a level above the cross-piece 18. The third element is bent in a rearward location as shown. Finally, separate stabilizing elements 24 are secured between the rear and front legs to keep the lower portion of the two sets of legs appropriately spaced. As stated, the chair may be collapsed for travel or storage.

Turning now to the core of the invention, the chair further comprises a fabric strip or sling 36. The upper rearward portion of the sling 36 has a coextensive back panel (not shown) secured thereto at its top and sides to define a pocket 40 which receives the top of the tubular frame. The sling extends downward to constitute a back-supporting portion 42 and a seat-supporting portion 44. The forward lower end of the sling loops around the forward cross member 18 and is doubled back under the seat portion 44 in a tail 46 (FIG. 2). As shown along the opposite margins of the underside of the seat portion 44 and continuing along the margins of the tail portion 46 are strips of woven fastener 48, 50, such as "Velcro".

An elongate seat-reinforcing web 52 of fabric is provided separate from the sling 36. It is encircled (FIG. 5) by spaced bands 54 of woven fasteners adapted to mate with the strips 48, 50 on the sling 36. These bands are spaced apart the same distance as the bands 48, 50 on the seat and tail portions 44, 46 of the sling.

In assembly the bands 54 of the transverse web 52 are engaged against the respective bands 48, 50 of the underside of the seat portion 44 at a selected position so that when the sling and web are installed on the frame 12, the support web comes at the proper position in the seat portion to the liking of the occupant. The opposite ends of the transverse reinforcing web 52 are provided on opposite sides (FIG. 2) of the web 52 with large rectangular patches of woven fasteners 56, 58 of complementing nature.

In continuing description of the installation of the sling 36 and web 52 to the chair frame 12, the doubled-back section of the tail 46 is brought taut and pressed up against the underside of the support web 52 so that the bands 48, 50 engage respectively the bands 54 of the web under the seat portion 44. The engagement of the woven fastener bands 48,50 with the bands 54 are sufficient to secure the front end of the sling 36.

In the next step, the ends of the web 52 are brought around the side elements 22 and are brought down and inward against the underside of the seat portion 44, the non-woven fastener rectangles being brought together in secure releasable attaching relationship to effectively impart to the reinforcing web 52 the desired amount of tension to give proper support to the seat portion 44.

The adjustable nature of the sling and support panels will be appreciated. In the first place, by selectively positioning the tail 48 against the midsection of panel 52 with the nonwoven fastener bands 48, 50 engaging bands 54 just the desired amount of slack in the sling can be effected. Additional adjustments are in the positioning of the cross web 52 with respect to the seat portion 44 forward or rearward in the final assembly. The support can be localized to the position desired.

Figure 4:
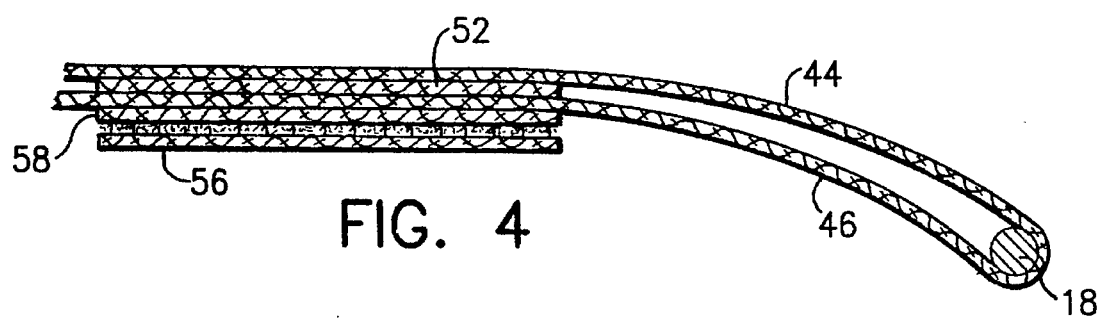
FIG. 4 is an enlarged sectional view taken on the line 4—4 of FIG. 1.

Further, the tension on the support panel 52 can be increased or decreased depending on the relative position of the ends of the panel 52 under the chair as those end rectangular portions are mating. In this manner, because the side elements 22 are high relative to the cross-piece 18, an elevated seat portion 44 relative to the cross-piece 18 can be achieved (FIG. 4). This, of course, assures that the occupant will not have the pressure of the band 18 on the underside of his knees. The tension on the forward or rearward edges of web 52 can be respectively varied to some degree by angling the mating of the rectangular patches of woven fastener 56, 58 (FIG. 6).

Thus, the novel arrangement of the fabric and non-woven fasteners provide adjustability of the chair to the comfort of everyone, even the more heavyset occupant. The adjustability is readily effected so that the seat portion 44 will be higher than the cross-piece 18 so that the occupant will not have the pressure of the cross-piece 18 on the underside of his knees.

The adjustability is readily selected to suit and is totally inconspicuous to the usual observer.

Variations in the invention are possible. Thus, while the invention has been shown in only one embodiment, it is not so limited but is of a scope defined by the following claim language which may be broadened by an extension of the right to exclude others from making, using or selling the invention as is appropriate under the doctrine of equivalents.

What is claimed is:

1. Occupant-support fabric for a tubular chair frame including a back frame in the form of an inverted "U" with a pair of parallel side generally vertical elements, and an associated seat frame in the form of a pair of generally horizontal tubular side elements and a front tubular cross-piece running therebetween at a level therebelow, the fabric comprising:

a. an elongate sling of fabric having a pocket at its upper end and a tail at its lower end, the pocket adapted to receive the upper end of the back frame, the tail of the sling adjacent the elongate side edges on the same side as the pocket being provided with strips of woven fastener;

b. an elongate cross web perpendicular to and under the sling and having encircling bands of mating woven fastener spaced apart to coincide with the strips on the sling, the bands engaging the strips respectively, the opposite ends of the cross web having patches of woven fastener and mating woven fasteners respectively on opposite sides thereof, the tail of the sling adapted to extend over the cross-piece and being doubled back under the sling, the strips engaging the underside of the bands and engaging the mating woven fastener, the ends of the cross web adapted to extend over the respective side elements and be doubled back inward under the sling with the patches on opposite ends being releasably interengaged whereby the seat and back is adjustable both with respect to the slack of the sling and the position and amount of support provided by the cross web.

2. Occupant-support fabric as claimed in claim 1 wherein the patches are interengaged canted with respect to each other to make one edge of the cross web under the sling more taut than the other.

\* \* \* \* \*

UNITED STATES PATENT AND TRADEMARK OFFICE
CERTIFICATE OF CORRECTION

PATENT NO. :   5,476,308
DATED      :   Dec. 19, 1995
INVENTOR(S):   Robert J. St. Germain It is certified that error appears in the above-identified patent and that said Letters Patent is hereby corrected as shown below:

On the title page:

Item (22), Filing Date:

Cancel "Mar. 17, 1995", insert --May 17, 1995--

Signed and Sealed this

Seventh Day of May, 1996

Attest:

BRUCE LEHMAN

Attesting Officer

Commissioner of Patents and Trademarks